United States Patent
Ittycheriah et al.

[11] Patent Number: 6,041,300
[45] Date of Patent: *Mar. 21, 2000

[54] SYSTEM AND METHOD OF USING PRE-ENROLLED SPEECH SUB-UNITS FOR EFFICIENT SPEECH SYNTHESIS

[75] Inventors: Abraham Poovakunnel Ittycheriah; Stephane Herman Maes, both of Danbury, Conn.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/821,520

[22] Filed: Mar. 21, 1997

[51] Int. Cl.$^7$ ........................................... G10L 5/04
[52] U.S. Cl. .................... 704/255; 704/266; 704/270; 379/88.03; 455/563
[58] Field of Search ..................... 704/255, 256, 704/258, 266, 270

[56] References Cited

U.S. PATENT DOCUMENTS

| | | | |
|---|---|---|---|
| H1646 | 5/1997 | Kato et al. | 379/355 |
| 4,707,858 | 11/1987 | Fette | 704/255 |
| 4,882,759 | 11/1989 | Bahl et al. | 704/255 |
| 4,928,302 | 5/1990 | Kaneuchi et al. | 379/88 |
| 5,165,095 | 11/1992 | Borcherding | 379/88 |
| 5,390,278 | 2/1995 | Gupta et al. | 704/256 |
| 5,463,715 | 10/1995 | Gagnon | 704/258 |
| 5,696,879 | 12/1997 | Cline et al. | 704/260 |
| 5,719,921 | 2/1998 | Vyotsky et al. | 379/88 |
| 5,970,453 | 10/1999 | Sharman | 704/258 |

FOREIGN PATENT DOCUMENTS

0515709A1  5/1991  United Kingdom.

OTHER PUBLICATIONS

Parsons. Voice and Speech Processing. McGraw–Hill, Inc. New York. p. 94, 1987.
Holmes, J.N. Speech Synthesis and Recognition. Chapman & Hall. pp. 4, 136–137, 1988.
Rabiner et al. Fundamentals of Speech Recognition. pp. 458–475, 1993.

*Primary Examiner*—Stephen R. Tkacs
*Assistant Examiner*—M. David Sofocleous
*Attorney, Agent, or Firm*—Whitham, Curtis & Whitham; Paul J. Otterstedt

[57] ABSTRACT

A speech recognition system is disclosed useful in, for example, hands-free voice telephone dialing applications. The system will match a spoken word (token) to one previously enrolled in the system. The system will thereafter synthesize or replay the recognized word so that the speaker can confirm that the recognized word is indeed the correct word before further action is taken. In the case of voice activated dialing, this avoids wrong numbers. The token itself is not explicitly recorded; rather, only the lefemes may be recorded from which the token can be reconstructed for playback. This greatly reduces the amount of disk space that is needed for the database as well as provides the ability to reconstruction data in real time for synthesis use by a local name recognition machine.

14 Claims, 4 Drawing Sheets

SYSTEM AND METHOD OF USING PRE-ENROLLED SPEECH SUB-UNITS FOR EFFICIENT SPEECH SYNTHESIS

BACKGROUND OF THE INVENTION

1. Field of the Invention

The present invention generally relates to speech recognition and, more particularly, to a system for replaying a recognized utterance, without actually recording the utterance, so that a user can confirm that the utterance was properly recognized, useful in, for example, hands-free voice telephone dialing applications.

2. Description of the Related Art

Pattern recognition, and particularly speech recognition is a desirable way in which to input data and commands into systems which traditionally relied on keyboards, keypads, or other "hands-on" devices. Keyboards, while the current standard to input data, are slow and prone to error subject to the skill and expertise of the typist. In some modern day applications, traditional keypads can even prove hazardous. For example, many cars are equipped with cellular or personal telephones which allow the driver to carry on telephone conversations while driving. However, it is usually dangerous and not particularly prudent for the driver to avert his attention from the road to dial a telephone number into the telephone keypad.

Voice dialing is an option on some portable telephones. In operation, the caller speaks a name of a person to be dialed or may speak aloud the phone number itself of the person to be dialed. Voice recognition circuitry processes the utterance and dials the telephone accordingly thereby avoiding the need for the user manually enter the number into the keypad.

Modern voice recognition circuitry does not fair well at correctly recognizing spoken numbers nor does it fair well with spoken name recognition since there are an infinite number of possibilities, many of which sound alike. This problem leads to frequent wrong numbers and unnecessarily increased cellular phone bills, not to mention user frustration.

Further, in modern voice synthesis circuitry, a recorded version of the speech is usually compressed using a speech coding algorithm. The compressed speech is used to provide playback of the word spoken. Due to space considerations, storing whole recorded versions of speech becomes impractical as the size of the vocabulary increases.

SUMMARY OF THE INVENTION

It is therefore an object of the present invention to provide a speech synthesis system combined with a voice recognition system which replays a recognized utterance so that a speaker can confirm whether the utterance was recognized correctly with or without the spelling of the name being available.

It is yet another object of the present invention to provide a voice activated remote telephone dialer with a voice activated name recognition dialing feature which repeats the recognized name so that the caller can confirm its correctness prior to dialing.

It is yet another object of the present invention to playback a waveform without explicitly recording the waveform, but rather to utilize the phonetic string for the name used in the recognition process to provide the audio feedback.

The invention recognizes words and phrases, hereinafter collectively referred to a tokens, which have been previously enrolled in the system. Enrollment is done by speaking the token into the system. The system labels the token with a set of phonetic. sub-units (e.g. lefemes). Also included with the lefemes (or other sub-units) are unigram, bigram, and trigram statistics. Additional information like duration of the middle phone and energy level are also extracted from the spoken word and recorded in a database. This process is repeated for a group of names or words in a vocabulary. The token itself is not explicitly recorded; rather, only the lefemes are recorded from which the token can be reconstructed for playback. This greatly reduces the amount of disk space that is needed for the database as well as provides the ability to reconstruct data in real time for synthesis use by a local name recognition machine. For telephone applications, each name in the vocabulary is associated with a telephone number for that person. For example, each word (name) in the vocabulary may be associated with a phone number for that person.

In operation, a user intending to extract a word previously enrolled, utters the word aloud. Recognition of the phone or sub-units sequence is done and the output passed to synthesizer circuitry which reconstructs the token from the stored lefemes and outputs the recognized utterance so that the speaker can confirm whether the utterance was indeed recognized correctly, for example by saying "yes" aloud. In the case of voice activated telephone dialing, if the speaker indicates that the name was correctly recognized, the number associated with the name is thereafter dialed. If the name was incorrectly recognized, the speaker will say "no", and the system will replay the next most likely pre-enrolled name or may wait for the speaker to repeat the name until it is correctly recognized.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
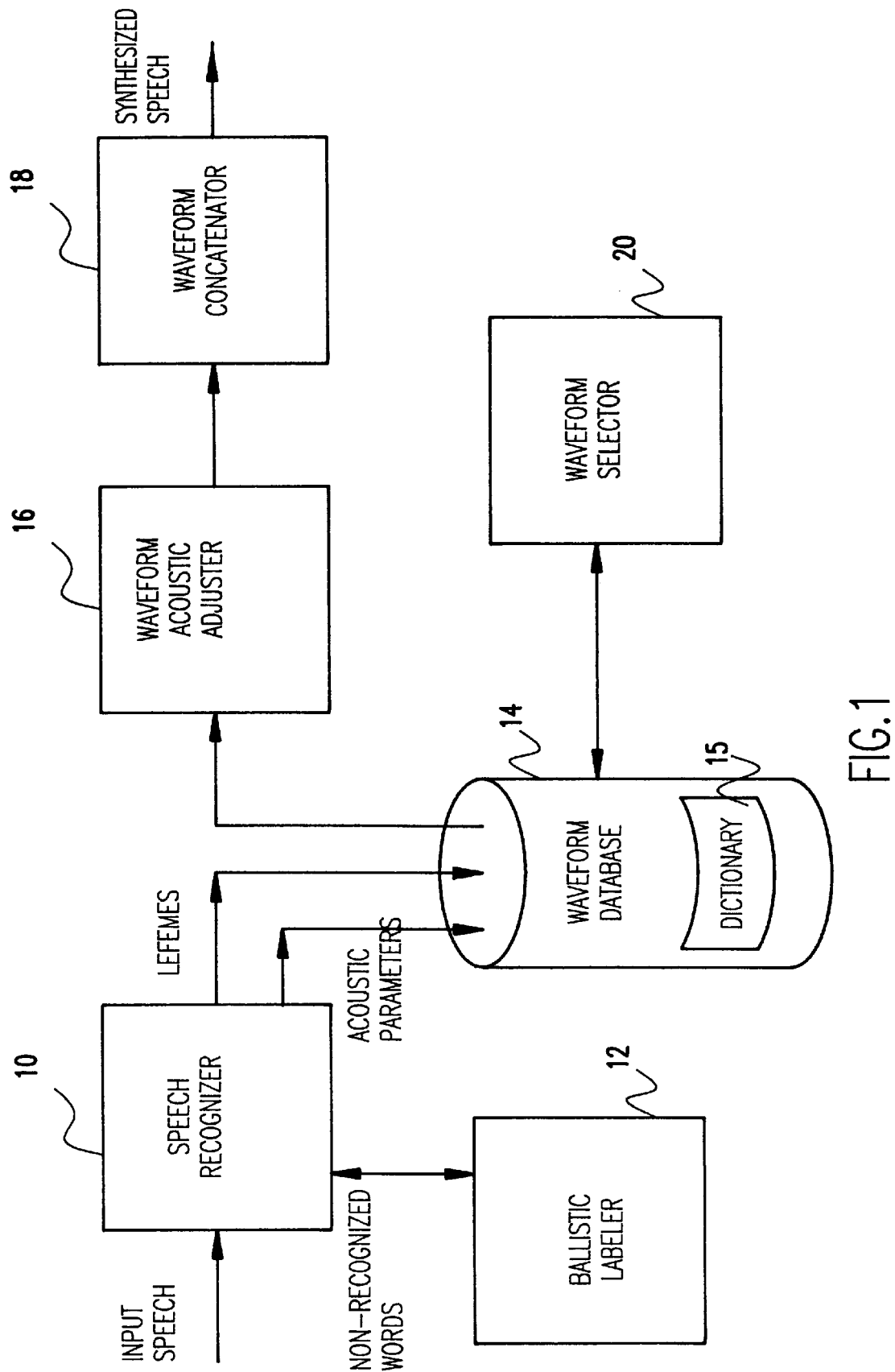
FIG. 1 is a block diagram showing the components of the present invention.

Referring now to the drawings, and more particularly to FIG. 1, there is shown a block diagram of the present invention. A speech recogizer 10 receives a spoken word or phrase (i.e., a token). Initially, during an enrollment stage, tokens are passed to a ballistic labeler 12 which decodes the token into lefemes and other acoustic parameters which are stored in a database 14. The waveform database, 14 can be determined apriori by using one or more voices to derive the relationship between the phones in a context (uniphone, biphone, thiphone, etc.). When decoding a token, this information will be used by a waveform selector 20 to generate the output given the sequence of lefemes that were decoded.

Lefemes are portions of phones in a given context. Typically each phone is modeled by three Hidden Markov Models (HMM) representing three parts or sub-units of the phone (beginning, middle, and end). These sub-units are characterized by the left and right context (phone on the left and on the right of the middle phone). Lefemes are the individual sub-units (i.e. context dependent portions of phones). Typically the sub-units are described by the different HMMs. The ballistic labeler 12 performs Viterbi alignment of the HMM models and picks up the sub-phone path corresponding to the best path. This one-to-one correspondence between the speech utterance and a sequence of lefeme is output from the ballistic labeler 12.

Decoded words are transcribed into lefeme sequences using an associated dictionary 15. The dictionary 15 is a file which provides possible sequences of lefeme for a given word (i.e. different ways to pronounce a given word in a language such as English). Essentially it is a set of legal pronunciations which correspond to known words. It is generated by aligning the HMM with utterances of each word and picking the sequences of lefeme encountered most often.

In a token extraction mode, matching waveforms are obtained for spoken tokens from the database by waveform selector 20. The different waveforms are adjusted (energy level, duration, etc . . . ) by waveform acoustic adjuster 16. Finally, the waveforms are concatenated at waveform concatenator 18 to produce a synthesized speech.

In operation, the speech recognizer 10 recognizes a sequence of lefeme corresponding to the best path, (i.e. the decoded script or the sequence of the word that the speech recognizer believes was said). The acoustic parameters output to the waveform database 14 is the information kept about each enrolling utterance or the corresponding features of the recognized utterance.

Non-recognized words (non-enrolled words)are associated with the sequence of lefeme produced by the ballistic labeler 12. The database 14 gets associated acoustic parameters (waveform, pitch, energy duration, etc.) to the lefemes. The waveform selector 20 matches the best waveform and parameter set out of the database 14 to match the input utterance. The waveform acoustic adjuster 16 transforms the waveform associated to each lefeme to optimally match the input utterance. Finally, the waveform concantenator 18 concatenates the resulting portion of transformed waveforms to produce synthesized speech.

Figure 2:
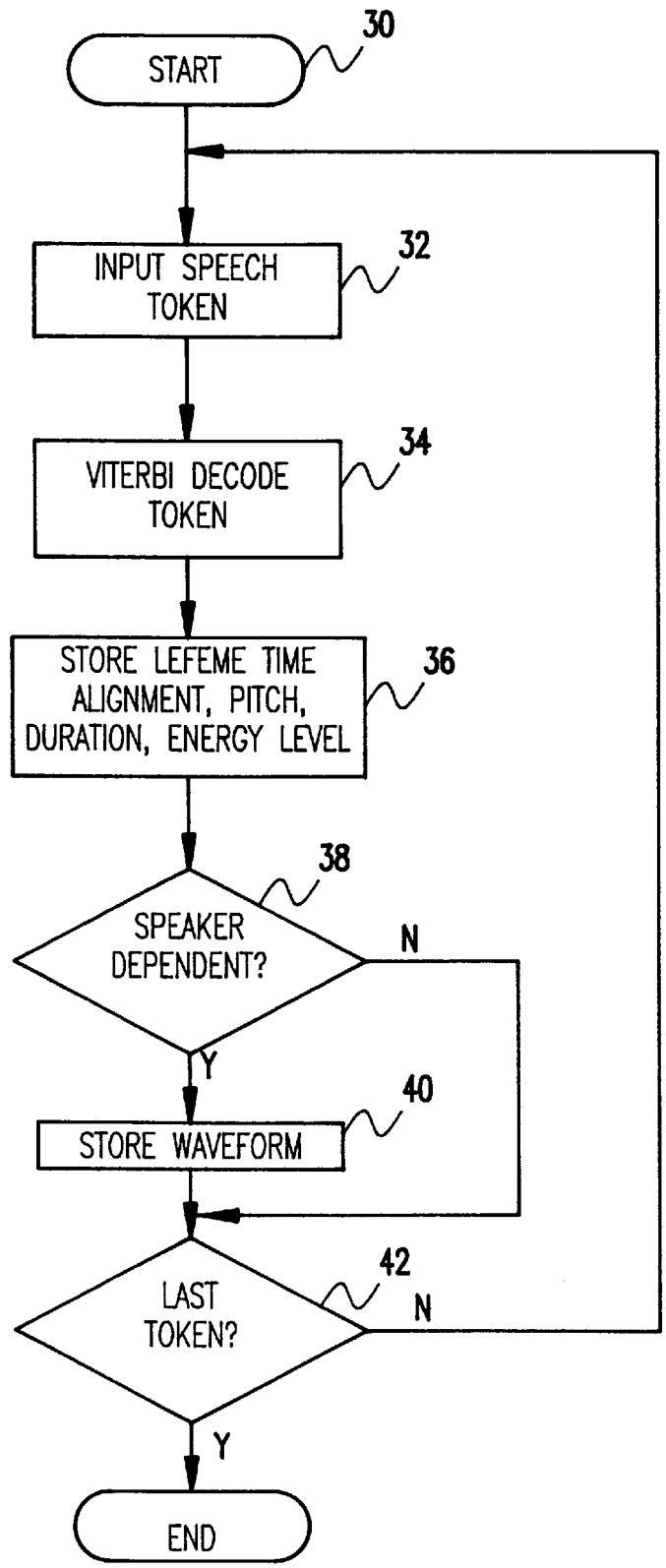
FIG. 2 is a flow diagram showing how a token is enrolled in the system.

Referring now to FIG. 2, there is shown a flow diagram showing how a token is enrolled in the system. In a first stage 30, speech tokens are input into the system at block 32. That is, a list of names and/or keywords is spoken by a same speaker or a pool of speakers into the system. This pool may even include all the users of the system. The speech is Viterbi decoded at 34. The optimal path defines the baseforms and the associated time alignments. Additional information like pitch, duration and energy level is also stored at 36. The baseforms (phonetic transcriptions) of the different names are stored in a database 14. Baseforms are different possible sequences of lefeme associated with a word.

These baseforms are either obtained by manual transcriptions or dictionary or using the ballistic labeler for unknown words. By going over the database, the lefemes (phone in a given left and right context) are associated to one or more waveform (e.g. with different durations and/or pitch). Pronunciation rules (or simply most probable bi-phone) are also used to complete missing lefemes with biphones (left or right) or uni-phones.

To enroll a name input into the system, the sequence of lefeme are obtained by looking up a dictionary for known words or using the ballistic labeler 12 for unknown words (e.g. proper names). At the end of the enrollment, the lefemes seen by the system are associated to the corresponding waveforms stored in waveform database, 14. When the system encounters lefemes not seen during the apriori waveform generation, the closest segment is derived using pronunciation rules (obtained by building decision trees over a speech database). The closest segment may be the current lefeme (or corresponding phone) in a uniphone or biphone context or even independent of the context.

If the system is speaker dependent, the waveform segments corresponding to unique occurrences of the lefemes can also be stored at 40. This can be done so that the feedback given to the user is in the user's own voice. Although this makes the system store segments explicitly per use, it has the advantage that only one occurrence of each lefeme is required and as the vocabulary size increases, the database doesn't get correspondingly large.

A speaker dependent system in one in which the synthesized voice is that of the speaker where as a speaker independent system is one in which the synthesized voice is that of another will always default to a speaker independent system whenever the lefeme is not enrolled. At decision block 42 if there are more tokens to be added to the system's vocabulary the procedure loops back to block 32 where a new speech token is input, else, enrollment is ended.

Figure 3:
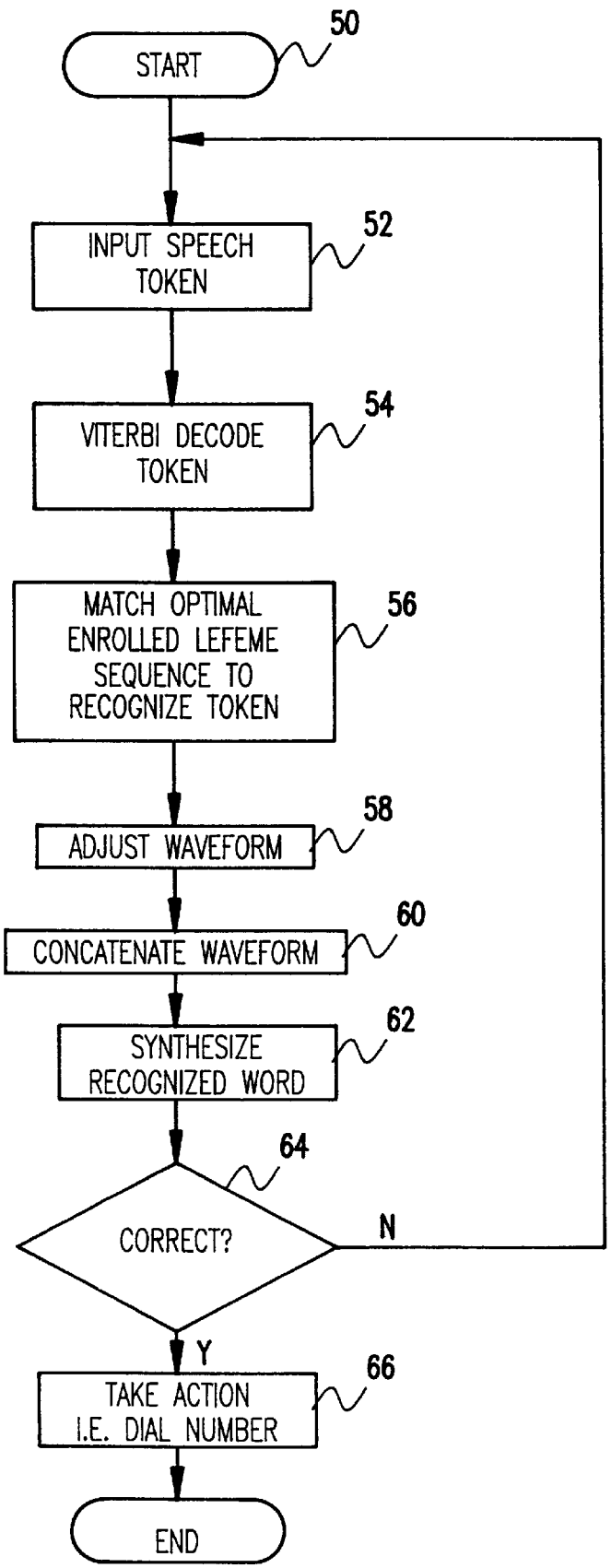
FIG. 3 is a flow diagram showing how a token is extracted from the system.

FIG. 3 is a flow diagram showing a user extracting a token previously enrolled. Starting at block 50, a user says a word to input a speech token into the system 52. In the case of voice activated dialing, the input speech may be a name which is associated with a telephone number. The token is Viterbi decoded into its lefeme baseforms at block 54. The waveform selector 20, matches the optimal enrolled baseform to the baseform of the token at block 56. The associated sequence of lefemes is transmitted to the database 14. A corresponding sequence is extracted from the database 14 trying to match the duration and pitch of the enrolling utterance. Whenever lefeme not enrolled is met, the closest lefeme with the same right or left context (bi-phone) or the most appropriate lefeme, independent of context (uniphone) is used.

The associated waveforms are re-scaled at the enrolling level for names/or key words previously enrolled by this speaker (speaker-dependent system). The energy level of each concatenated lefeme is the same level as the corresponding lefeme when it was enrolled by the speaker. The successive lefemes waveforms are thereafter concatenated 60. Discontinuities and spikes are avoided by pre-multiplying the two concatenated waveforms with overlapping windows $\omega_1(t)$ and $\omega_2(t)$ such that the sum of the windows is equal to 1 (i.e., $\omega_1(t)+\omega_2(t)=1$). This addition smooths the transition from one lefeme to another.

At decision block 64 the system will wait until the speaker confirms that the recognized word is correct, such as by, for example, speaking the word "yes". If the recognized word is correct, an action will be taken, such as dialing a telephone number associated with the recognized token 66. If at decision block 64 the name was incorrectly recognized, the speaker will say "no", and the system may replay the next most likely pre-enrolled name or may wait for the speaker to repeat the name until it is correctly recognized or leave it to the user to key in the information.

Figure 4:
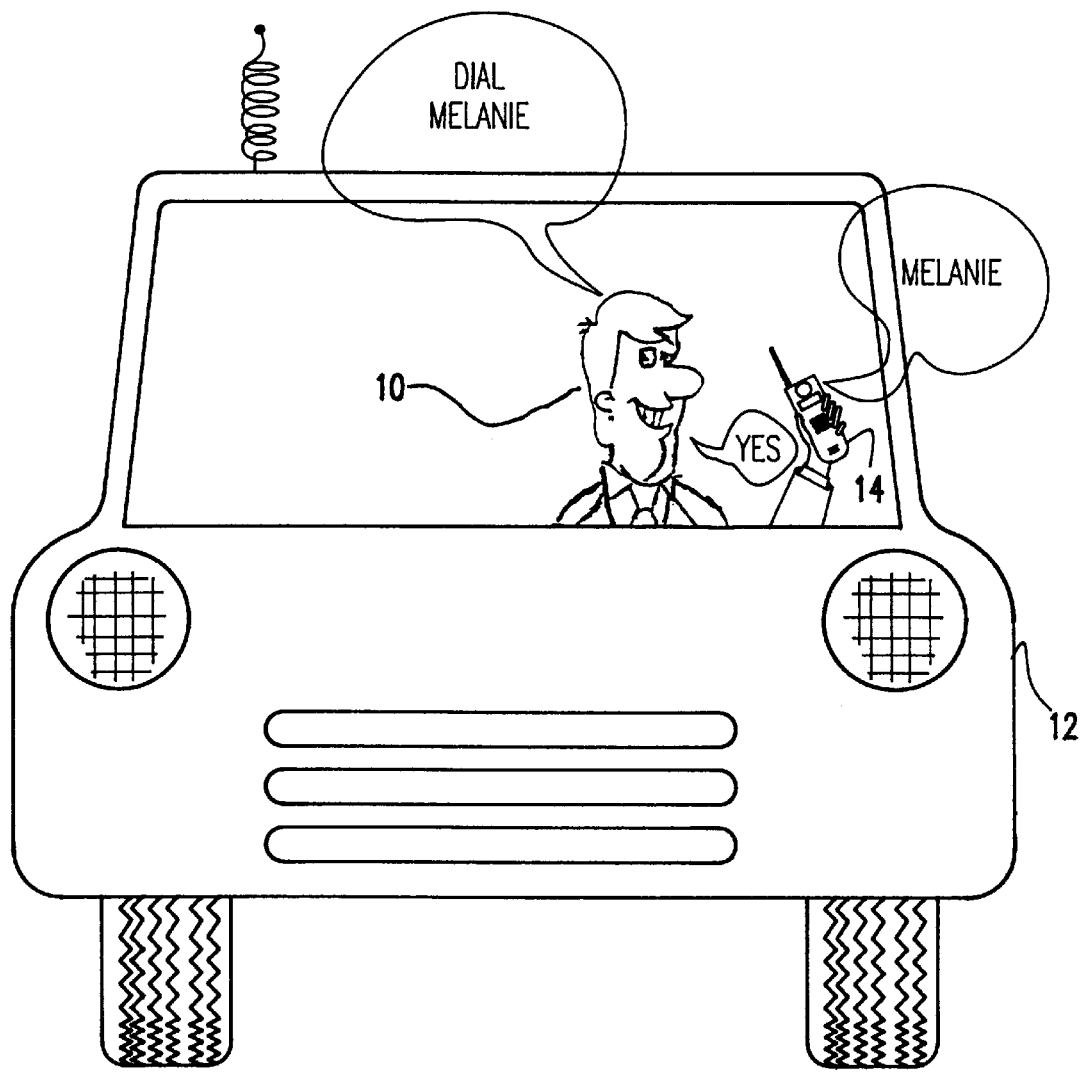
FIG. 4 is a diagram showing an example of the invention used in a voice dialing application.

FIG. 4 shows an example of the present invention used in a voice activated, hands-free telephone dialing application. A driver 10 driving a car 12 down the highway would like to place a telephone call to, for example, his daughter "Melanie" on a cellular telephone 14 employing the present invention. While the telephone 14 shown in FIG. 4 is a personal telephone, it is understood that it may also be a cellular car phone, speaker phone, or any other type of telephone where voice activated dialing is desirable. In operation, the lefeme associated with the word "Melanie" has been previously enrolled in the system and associated with a particular telephone number. To dial the number, the driver will simply utter the phrase "dial Melanie" out loud. The telephone 14 will recognize the word "dial" as a function command to dial the telephone number of the name of the person following, in this case "Melanie". The system will try to match the "Melanie" with a one of a number of pre-enrolled tokens and will then output its match aloud for the driver's 10 conformation. In this case, the driver 10 confirms that "Melanie" was indeed the correct token and the number is thereafter automatically dialed for the driver without the driver 10 ever taking his eyes off the road. For this example, upon the user speaking the word "Melanie", the system may recognize the following lefemes:

WORD1 | M_1 EH_5 L_2 A_1 N_3 IY_4

Here, the number following the underscore is an index. For example, there may be only one lefeme stored for M, hence, the system recognizes M_1. Similarly, there may be several "EH" lefeme stored and the system recognized the lefeme EH_5 as being the best choice for the word spoken, and so on for each lefeme in the spoken word. The waveform segments corresponding to this are then played. It is important to note that the entire waveform for "Melanie" is not stored, rather, the database 14 stores lefeme from which different combinations of lefeme can be concatenated to playback many different recognized words.

Further, if the word Melanie was to be generated without ever having seen it during a user enrollment, we could use spelling to sound rules (using dictionaries or decision tree algorithms that predict which phones occur with this spelling) to come up with the following phonetic transcription:

MELANIE | M EH L A N IY.

The phones in the context (for example in triphone context for phone EH: beg_M mid_EH end_L) could be used to look up the waveforms using the waveform database 14. If this triphone context (any context could be used in general) is not there in the waveform database, we may look to see if the biphone context (beg_M mid_EH) appears in the waveform database. These waveform can then be used to generate the feedback as before.

The invention may also be used in a network application. In a conventional network base dialer, a recording of the different names are stored in the central database. When a name is recognized by a local server, the full utterance must be sent to the server to be played back. Alternatively each server must store the full utterance for each user. This obviously take a lot of disc space and takes time to transfer these full utterances over the network. According to the present invention, a local server recognizes the name to be dialed. The central database sends the parameters necessary to synthesized the speech (which is much less than the recorded waveform) and the signal is synthesized locally reducing the network bandwidth and enabling use of the speech recognition technology in a wide-area network configuration.

In an alternate embodiment, the invention can be used to synthesize text-to-speech. In this case, lefemes are simply stored with the waveform, and associated parameters by Veterbi aligning hours of speech. Pronunciation rules are built using decision trees. In other words, with a classical decision tree algorithm, a correspondence is built between spelling and the lefeme. When a new text is to be synthesized, the decision tree is used to decide the sequence of lefeme which are concatenated to synthesize the text aloud.

While the invention has been described in terms of a single preferred embodiment, those skilled in the art will recognize that the invention can be practiced with modification within the spirit and scope of the appended claims.

We claim:

1. A speech recognition system, comprising:

speech receiving means for receiving a spoken token from a speaker;

storage means for storing instances of a plurality of lefemes corresponding to a plurality of tokens, said lefemes comprising portions of phones in a given context;

means for matching said spoken token to ones of said plurality lefemes stored in said storage means; and means for concatenating said ones of said plurality of lefemes to synthesize a recognized token in the speaker's voice.

2. A speech recognition system as recited in claim 1 further including means for taking an action in response to a correctly recognized token.

3. A speech recognition system as recited in claim 2 wherein said means for taking an action comprises dialing a telephone number associated with said correctly recognized token.

4. A method for synthesizing speech comprising the steps of:

inputting by a speaker a plurality of speech tokens comprising an enrolled vocabulary;

decoding each of said plurality of speech tokens into a plurality of lefemes associated with each of said plurality of speech tokens in said enrolled vocabulary, said lefemes comprising portions of phones in a given context;

storing instances of said plurality of lefemes as representative waveforms;

inputting a token to be recognized;

decoding said token to be recognized into a plurality of lefemes;

matching said lefemes of said token to be recognized to ones of said stored plurality of lefemes; and concatenating ones of said stored plurality of representative waveforms to synthesize a recognized token in the speaker's voice.

5. A method for synthesizing speech as recited in claim 4 further comprising steps of inputting confirmation that said recognized token is correct.

6. A method for synthesizing speech as recited in claim 5 further comprising the step of dialing a phone number associated with said recognized token if said recognized token is correct.

7. A method for synthesizing speech as recited in claim 4 wherein ones of said plurality of lefemes may be used to synthesis more than one of said recognized tokens.

8. A method for synthesizing speech as recited in claim 4 further comprising the step of transmitting ones of said stored plurality of representative waveforms between a server and a client over a network.

9. A method for synthesizing speech as recited in claim 8 further comprising steps of inputting confirmation that said recognized token is correct.

10. A method for synthesizing speech as recited in claim 4 wherein said token to be recognized is a speech token.

11. A method for synthesizing speech as recited in claim 4 wherein said token to be recognized is text.

12. A speech recognition and synthesis system, comprising:

speech receiving means for receiving spoken words from at least a first speaker;

a decoder for decoding the words into a plurality of associated lefeme waveforms, said lefeme waveforms comprising portions of phones in a given context;

storage means for storing instances said lefeme waveforms comprising an enrolled vocabulary;

means for inputting a word to be recognized from said enrolled vocabulary by a second speaker, said decoder decoding the word to be recognized into associated lefeme waveforms;

means for finding closest match lefeme waveforms between said associated lefeme waveforms and ones of said lefeme waveforms stored in said storage means; and means for concatenating said closest match lefeme waveforms from said storage means to synthesize a recognized word, wherein when the first speaker and the second speaker are the same person, said recognized word is synthesized in the person's own voice.

13. A speech recognition and synthesis system, as recited in claim 12 wherein said decoder is a Viterbi decoder.

14. A speech recognition and synthesis system as recited in claim 12 further comprising means for verifying that said recognized word is correct.

* * * * *